Sept. 24, 1968  J. J. THOMAS ET AL  3,403,206
METHOD FOR FORMING A FLUID CONDUIT
Filed June 24, 1965  2 Sheets-Sheet 1
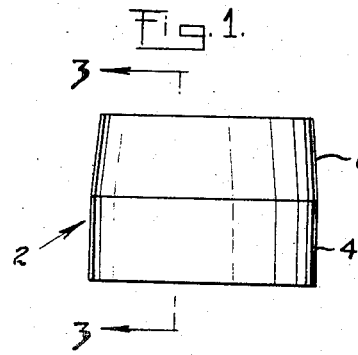
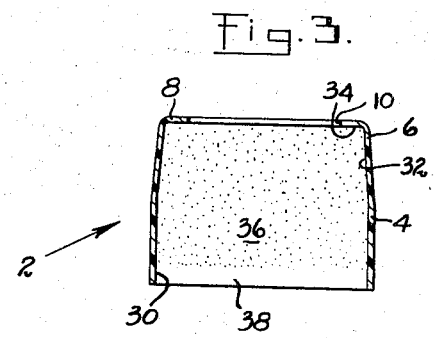
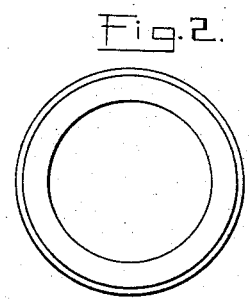
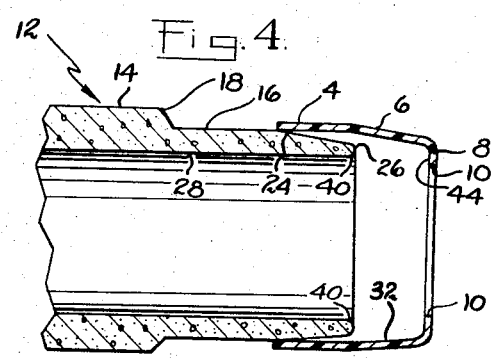
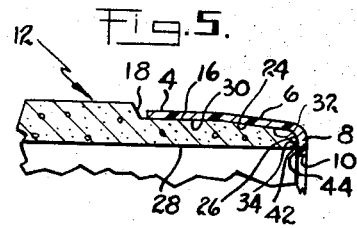
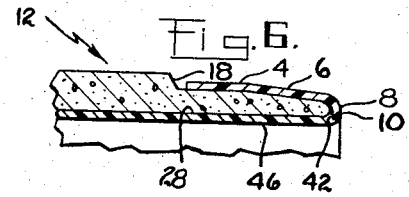
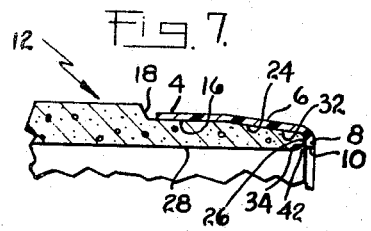
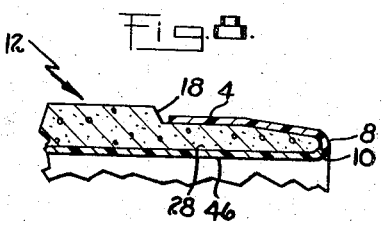
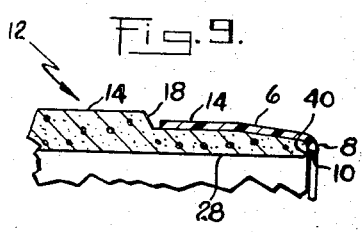
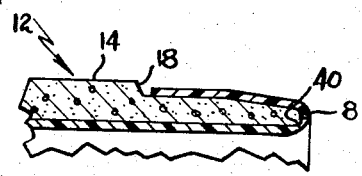
INVENTORS
JOSEPH JOHN THOMAS
ROBERT TYLER HUCKS
BY
ATTORNEY

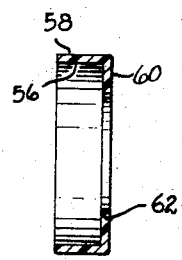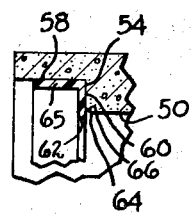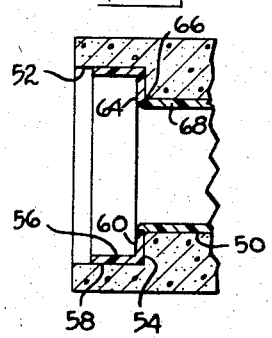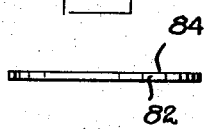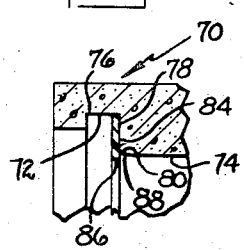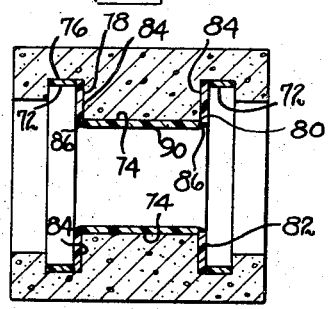

United States Patent Office 3,403,206
Patented Sept. 24, 1968

3,403,206
METHOD FOR FORMING A FLUID CONDUIT
Joseph John Thomas and Robert Tyler Hucks, Somerville, N.J., assignors to Johns-Manville Corporation, New York, N.Y., a corporation of New York
Filed June 24, 1965, Ser. No. 466,553
2 Claims. (Cl. 264—263)

ABSTRACT OF THE DISCLOSURE

A method of providing a protective covering of controllable thickness for the intersection of a tubular inner wall and a wall surface inclined thereto wherein a preformed covering is secured to the inclined wall surface to form a relationship in which a resin coating material being applied to the tubular inner surface cooperates and unites with the preformed covering to form a protective covering of controllable thickness over the intersection.

---

This invention relates to a method for producing a fluid conduit, such as a pipe, provided with a protective coating on its inner surface, on its end surfaces and on its outer surface at least in the portions adjacent the pipe ends and also to a method for producing innerly coated conduits in the form of either belled pipe ends or coupling sleeves. The invention is useful in producing conduits composed of and coated with a variety of different materials and connected by a variety of joints, but is particularly useful in producing resin coated cementitious pipes for connection by rubber ring joints of the general types disclosed in Turner, U.S. Patent No. 2,294,142, Heisler, U.S. Patent No. 2,738,992, Gerin, U.S. Patent No. 3,066,961, and Kazienko, U.S. Patent No. 3,137,509.

In Hucks, U.S. patent application Ser. No. 141,849, filed Sept. 29, 1961, now Patent No. 3,219,472, there is disclosed a coating method which has been used extensively in commercial production of epoxy-lined asbestos-cement pipes. Such pipes are frequently joined together by an asbestos-cement sleeve fitting relatively loosely over the adjacent ends of each pair of adjoining pipes, there being a groove in each end of the sleeve containing a resilient gasket, usually a rubber ring, proportioned in size so as to bear against the outer surface of the pipe end located within the end of the sleeve. The rubber rings seal the joint against fluid pressure from within the pipe line so long as they remain in place in the grooves and are squeezed to some extent between the outer surfaces of the pipes and the bottoms of the grooves. In such a construction the pipe end surfaces, the pipe outer surface portions between the gaskets and the pipe end surfaces, and the sleeve inner surfaces between the gaskets are exposed to fluids within the pipe line and hence must also be provided with a protective coating if the pipe line is to be used for conveying fluids which may attack the base material of the pipes and sleeve. In a bell and spigot type joint, the bell corresponds, in effect, to half of the sleeve described above. This invention is concerned with the problem of providing adequate protective coatings on the pipe end surfaces, on the pipe outer surfaces adjacent the ends and on portions of the inner surface of sleeves and bells.

In one of the methods disclosed in the Hucks application, a heated liquid resin is sprayed onto the inner surface of a rotating pipe. Rotation of the pipe is continued until the liquid resin has solidified into a hard, smooth, blister-free, chemical-resistant, and fluid-impervious coating. Such a procedure adequately coats only the inner surface of the pipe, however, and it has been necessary heretofore to coat the pipe end surfaces and the pipe outer surfaces adjacent the ends by hand brushing. It has been found substantially impossible by hand brushing consistently to provide these surfaces, and particularly the intersection of connecting adjoining surfaces, with a coating which has sufficient thickness and uniformity to provide adequate protection against damage to the coating during handling or against failure of the coating when in contact with aggressive fluids. Sharp corners are the most difficult to coat adequately but even rounded corners are troublesome. It is very difficult, if not impossible, to apply by casting an adequate coating of liquid resin to a surface which is steeply inclined at the time of application.

The same problems occur in coating the inner surfaces of bells or sleeves, particularly at and adjacent the intersection of the inner end wall of the groove for the gasket and inner surface of the sleeve or bell. Coating of these parts cannot be adequately done by centrifugal casting, and the hand brushing method has not been satisfactory for the reasons indicated above.

The primary object of this invention is to provide a method for producing a fluid conduit with an adequate protective coating of a hard, smooth, blister-free, chemically-resistant, and fluid-impervious material on all portions of the conduit which may be exposed to aggressive fluids during use and particularly at corners between surfaces at substantial angles to each other.

In several embodiments of the invention, a portion of the surface area to be coated is covered with a cured, relatively hard, somewhat flexible, preformed element of plastic material, and the remainder of the surfaces to be coated have cast thereon an initially hot liquid resin material capable of flowing during casting into contact with the preformed elements and becoming welded to it to form a continuous coating. In some of these embodiments the preformed element is shaped so as to cover or extend around or beyond an intersection and thereby itself provide the intersection with a covering of the desired thickness. In other embodiments the preformed element does not cover the intersection but a part thereof which, though spaced from the intersection cooperates with the surfaces defining the intersection to form a cavity for the liquid resin coating causing it to accumulate over the intersection in the desired thickness.

The invention will be more fully understood and further objects and advantages thereof will become apparent when reference is made to the following detailed description of a preferred embodiment of the invention and the accompanying drawings in which:

FIG. 1 is a view in side elevation of a preformed protective covering of the instant invention;

FIG. 2 is a bottom plan view of the preformed protective covering of FIG. 1;

FIG. 3 is a view in section take on a plane passing through the line 3—3 of FIG. 1;

FIG. 4 is a view illustrating a preformed protective covering in initial position over the end portion of a pipe;

FIG. 5 is a view illustrating one assembly of a preformed protective covering in position over the end portion of a pipe;

FIG. 6 is a view illustrating a final product of the assmbly in FIG. 5 after the coating material has been applied thereto;

FIG. 7 is a view illustrating another assembly of a preformed protective covering in position over the end portion of a pipe;

FIG. 8 is a view illustrating a final product of the assembly in FIG. 7 after the coating material has been applied thereto;

FIG. 9 is a view illustrating another assembly of the preformed protective covering in position over the end portion of a pipe;

FIG. 10 is a view illustrating a final product of the assembly in FIG. 9 after the coating material has been applied thereto;

FIG. 11 is a view in side elevation of another preformed protective covering for use in the belled end of a pipe;

FIG. 12 is a view illustrating an assembly of a preformed protective covering in position in the belled end of a pipe;

FIG. 13 is a view illustrating a final product of the assembly of FIG. 12 after the coating material has been applied;

FIG. 14 is a view in side elevation of another preformed protective covering for use in a pipe coupling;

FIG. 15 is a view illustrating an assembly of a preformed protective covering in position in the grooves of a pipe coupling; and FIG. 16 is a view illustrating a final product of the assembly of FIG. 15 after the coating material has been applied.

Referring to the drawings and in particular to FIGS. 1–3, inclusive, there is illustrated a preformed protective covering of the instant invention comprising a generally circular, hollow nosepiece 2 having a cylindrical section 4, frustum 6, and annular portion 8, it being understood that the nosepiece 2 is one integral unit wherein the annular portion 8 is provided with a generally cylindrical inner surface 10. The nosepiece 2 is designed for use with an end portion of a pipe such as that illustrated in FIGS. 4 and 5 showing an end portion 12 of a pipe having generally cylindrical outer surfaces 14 and 16 of differing diameters joined by a shoulder 18. In the embodiments of the invention, illustrated in FIGS. 4–10, inclusive, the shoulder 18 is slanted, but the shoulder may be of any desired configuration or may be omitted. The end portion 12 of the pipe if further provided with a tapered portion 24 having a generally frustum shaped outer surface, an axial extremity having a generally radially extending surface 26, and a generally cylindrical inner surface 28. The end portion 12 is an integral portion of a full length of pipe which in the preferred embodiment of the invention comprises an asbestos-cement pipe.

The surfaces 30, 32, and 34 of the nosepiece 2 are the inner surfaces respectively of the generally cylindrical surface 4, the frustum 6, and the annular portion 8 and are complementary respectively to the outer surface of the section 16, the tapered portion 24, and the axial extremity 26 of the end portion 12. Thus, when the nosepiece 2 has been moved over the end portion 12 and the pipe is in operating condition, the surfaces 16 and 30. 24 and 32, and 26 and 34 are in contiguous relationship. As illustrated in FIGS. 5–9, inclusive, the nosepiece 2 has an axial length slightly less than the axial distance between surface 26 of the axial extremity and the base of the shoulder 18 to provide a tolerance to insure the contact between the complementary surfaces 26 and 34.

In this embodiment of the invention, the nosepiece 2 is formed so that the diameters of the inner surfaces 30 and 32 are approximately the same as the diameters of the outer surfaces 16 and 24 when both the nosepiece 2 and the end portion 12 of the pipe are at temperature greater than ambient. However, when both the nosepiece 2 and the end portion 12 are at ambient temperature, the diameters of the inner surfaces 30 and 32 of the nosepiece 2 are less than the diameters of the outer surfaces 16 and 24. Thus, at ambient temperature there is an interference fit between the nosepiece 2 and the end portion 12. Preferably, the diameter of the inner peripheral surface 10 of the annnlar portion 8 of the nosepiece 2 is slightly less than the diameter of the inner surface 28 of the end portion 12 of the pipe for a purpose to be described below.

In preparing a pipe and particularly the end portion thereof, for providing such end portions with a protective covering in accordance with the instant invention, the pipe, including the end portion 12, is heated to a temperature greater than ambient. The surfaces 30, 32 and 34 of the nosepiece 2, at ambient temperatures, are coated with an adhesive 36 in such a manner as to leave an annular ring 38 on the surface 30 having no adhesive thereon. The nosepiece 2, still at ambient temperature, is placed over the end portion 12 of the pipe, and because of the differences in diameters, as explained above, the uncoated ring 38 of the inner surface 30 will contact the outer surface 24 of the end portion 12 as illustrated in FIG. 4. Since the nosepiece 2 is relatively thin in a radial direction as compared to the end portion 12, the heat from the end portion 12 will quickly raise the temperature of the nosepiece 2 until it is approximately the same as the temperature of the end portion 12, thus causing the nosepiece to expand so that it may be gradually moved over the end portion 12 until the surface 34 of the annular portion 8 contacts the surface 26 of the axial extremity of the end portion 12 of the pipe. The nosepiece 2 is now in assembled position with the surfaces 30, 32, and 34 in contiguous relationship respectively with the surfaces 16, 24, and 26 separated therefrom, except for the annular ring portion 38, by the relatively thin adhesive coating 36. Since no adhesive is applied to the annular ring portion 38, this portion of the nosepiece 2 is in frictional engagement with the axially inner portion of the outer surface 16 of the end portion 12. The adhesive 36 preferably is of a thermosetting type since the end portion 12 and the nosepiece 2 are at elevated temperatures. The setting time of the adhesive 36 should be about the same as the time required for the coating material to cure to a point of resisting flow or slumping. In the above description, the interference fit between nosepiece 2 and the end portion 12 of the pipe is provided by the differences in the coefficients of thermal expansion between the material of the nosepiece and the material in the end portion of the pipe. In some instances, it may be possible to accomplish this interference fit in other ways. Thus, the nosepiece might comprise a material which would have sufficient increased plasticity at elevated temperatures so that the nosepiece 2 could be stretched over the end portion of the pipe while still mainttining uniformity of dimensions around the entire nosepiece. Other means might also be used to provide the interference fit.

In providing a coating on the inner surface of a tubular conduit, such as an asbestos-cement pipe, by the casting of a resin material thereon, extreme difficulty is encountered in obtaining a proper thickness of such coating on surfaces which extend, in any substantial degree, in a generally radial direction and at the intersection of this type of generally radially extending surface with an axially extending surface. Thus, extreme difficulty would be encountered in casting a coating on the surface 26 of the axial extremity of the end portion 12 and the intersection 40 of the surface 26 and the inner surface 28 of the end portion 12. Since the pipe is rotated during the casting of the coating material and the cure of such coating material to the point of resisting flow or slumping, it is virtually impossible to cast a coating on the surfaces 16 and 24. The instant invention provides a new and novel solution to the problem of providing these surfaces with a protective covering where it is desired to protect the inner surface of a pipe by a coating material cast thereon. The nosepiece 2, as explained above, provides the protective covering for the surfaces 16, 24, and 26 of the end portion 12 by being in contact with these surfaces. The term, in contact, as used herein means either actual contact or contact through adhesive such as the adhesive 36 described above in relation to FIGS. 3 and 4. Since the roundness of asbestos-cement pipe varies within fairly large tolerance ranges, it is not practical to have the nosepiece 2 extend around the intersection 40 and enter within the inner surface 28 of the end portion 12. Also, in the manufacture of asbestos-cement pipe, the surfaces 26 and 28 adjacent the intersection 40 generally have a slight roundness so the nosepiece 2 does not make contact at this location. Therefore, it is necessary to provide protection for the intersection 40 and the surfaces 26 and 28 adjacent the intersection 40. In the instant invention, the inner surface 10 of the annular portion 8 is dimensioned to have a diameter slightly less than the diameter of the inner surface 28 of the end portion 12. Therefore, when the nosepiece 2 is in assembled position on the end portion 12, there exists a cavity 42 defined by the surfaces of a part 44 of the annular portion 8 and the surfaces 26 and 28 adjacent the intersection 40. This cavity 42 together with the part 44 of the annular portion 8, which provides an obstruction to the flow of any coating material over the intersection 40, functions to control the flow of the resin coating material cast on the inner surface 28 of the end portion 12 until such resin coating material has cured to a point of resisting flow or slumping so as to provide protective covering of sufficient thickness for the surfaces 26 and 28 adjacent the intersection 40.

After the nosepiece 2 has been placed in position over the end portion 12, the pipe while still at temperatures greater than ambient is placed on suitable means and rotated. During the rotation of the pipe, a suitable means such as that disclosed in U.S. Patent No. 3,133,702 is moved through the pipe so as to apply a continuous coating of a desired type of material, such as any of those described in the Hucks application, on the inner surface of the whole pipe and as illustrated in FIG. 6 on the inner surface 28 of the end portion 12. Since the end portion 12 of the pipe and nosepiece 2 are at temperatures greater than ambient during the application of such coating material, the thermosetting adhesive between the complementary sections of the end portion 12 and the nosepiece 2 has not had sufficient time to cure or set when it is necessary to apply the coating material. Under ordinary conditions, this uncured or unset adhesive would act as a lubricant, and the rotation of the pipe could cause the nosepiece to move out of its proper position over the end portion 12. However, the nosepiece 2 is held in the proper position on the end portion 12 by the frictional forces resulting from the engagement between the annular ring portion 38 of the nosepiece 2 and the corresponding portions of the outer surface 16. The coating material is applied in sufficient quantities to the inner surface 28 of the end portion 12 and the inner surface 10 of the annular portion 8 so as to fill the cavity 42 and to blend the coating material with the annular portion 8. Thus, a coating 46, which is continuous in both the circumferential and axial directions, is provided over the inner surface 28 of the end portion 12, the inner surface 10 of the nosepiece 2, and the surfaces 26 and 28 adjacent the intersection 40. The extra coating material at the intersection 40 provides excellent protection for this particularly vulnerable area of the pipe.

In the foregoing explanation, the inner surface 10 has been described as having a diameter less than the diameter of the inner surface 28 of the end portion 12 to provide for the cavity 42. This relationship has been set forth in this manner to insure the presence of the cavity 42 which is provided to obtain a proper thickness of the coating material over the surfaces 26 and 28 adjacent the intersection 40. In those instances where the axial extremity of the pipe is well-rounded, the diameter of the inner surface 10 of the nosepiece 2 may be greater than the diameter of the inner surface 28 of the end portion 12 so long as the diameter of the inner surface 10 is less than the diameter of the location of contact of the surface 26 of the axial extremity with the surface 34 of the nosepiece 2 so that a cavity 42 of some nature is formed between the surface of the part 44 of the annular portion 8 of the nosepiece 2 and the surface 26 adjacent the intersection 40. This situation is illustrated generally in FIGS. 7 and 8 which show that the thickness of the coating material over the surfaces 26 and 28 adjacent the intersection 40 is still thick enough to provide the proper protection for this area of the pipe. The provision of the cavity 42 prevents the results depicted in FIG. 9 wherein the inner surface 10 of the annular portion 8 is substantially larger than the diameter at the intersection 40. When the coating material is applied to the inner surface of the end portion 12 of the pipe and the nosepiece 2 in the structure illustrated in FIG. 9, the coating material has a tendency to run over the surfaces 26 and 28 defining the intersection 40 so that the coating material at this area is too thin to provide proper protection for the pipe. While it is recognized that the surfaces 26 and 28 adjacent the intersection 40 will receive adequate protection so long as the inner surface 10 is substantially the same in diameter as the diameter defined by the contact between surface 26 of the axial extremity and the surface 34 of the nosepiece 2, the tolerances associated with asbestos-cement pipe are such that it is most desirable to provide for the cavity 42 to insure the proper protection for the surfaces 26 and 28 adjacent the intersection 40 of the end portion 12 of the pipe.

In the preferred embodiment of the invention, the nosepiece 2 comprises an acrylonitrile butadiene styrene compound such as that marketed by Marbon Chemical Company under the trade designation Cycolac GSE. It is to be understood, however, that the nosepiece 2 may comprise other types of materials such as polyester, poly (vinyl chloride), urethane, and other types of resinous or metallic materials that are capable of providing the desired physical and chemical characteristics. The nosepiece 2 is manufactured to have the dimensional characteristics as described above so as to mate properly with the end portion of the pipe which in the preferred embodiment of the invention comprises an asbestos-cement pipe but may comprise any type of porous or nonporous pipe. Thus, a nosepiece 2 for a 6-inch asbestos-cement sewer pipe would have a thickness of approximately 0.025 inch with the internal surface 30 having a diameter at ambient temperatures of about 6.63 inches and a diameter at 220° F. of about 6.67 inches. The surface 32 would have a taper of about 12° and be about 1.0 inches in axial extent at ambient temperatures and at 220° F. The 6-inch asbestos-cement pipe for use with such a nosepiece has a surface 16 having a diameter of about 6.66 inches at ambient temperatures and a diameter of about 6.67 inches at 220° F. The tapered surface 24 of such pipe has a taper of about 12° and is about 1.0 inches in axial extent at ambient temperatures and at 220° F. The surface 34 of the annular portion 8 extends in a radial direction a distance of about 0.15 inch both in ambient temperatures and at 220° F. The inner surface 28 of the end portion 12 of the pipe immediately adjacent the intersection 40 has a diameter of about 6.00 inches at ambient temperature and a diameter of about 6.01 inches at 220° F. The diameter of the inner surface 10 of the nosepiece 2 of the annular portion 8 of the nosepiece 2 at ambient temperatures is about 5.97 inches. Thus, the cavity 42 has a radial depth or thickness at 220° F. of about 20 mils. As is evident from the foregoing dimensions, the nosepiece 2 is designed to provide the cavity 42 whether or not the surfaces 26 and 28 adjacent the intersection 40 are rounded or not. The nosepiece 2 for a 12-inch asbestos-cement sewer pipe is similarly dimensioned so that the associated surfaces of the end portion 12 and the nosepiece 2 have substantially the same diameter at 220° F. and have an interference fit of about 0.06 inch at ambient temperatures. A nosepiece 2 for an 18-inch asbestos-cement sewer pipe is similarly dimensioned to that the associated surfaces of the end portion 12 and the nosepiece 2 have substantially the same diameter at 220° F. and an interference fit of about 0.08 inch at ambient temperatures. In both the 12- and 18-inch pipe, the cavity 42 has a radial depth or thickness of about 20 mils.

After the coating material has been applied, the rotation of the pipe is continued until the coating material has cured to a point of resisting flow or slumping. As the pipe and nosepiece cool, they tend to return to their ambient temperature conditions. Since the pipe at ambient temperature has a diameter greater than the diameter of the nosepiece, the aforementioned interference fit results so that the nosepiece 2 is snug around the outer surface of the end portion of the pipe. As noted above in a 6-inch pipe, the differences are such that an interference fit of 0.03 inch results. The inner surface 10 of the annular portion 8 because of its greater radial thickness and its lack of contact with any surface of the end portion 12 does not expand in response to the thermal conditions in any substantial amount. The gradual curing of the adhesive between the surfaces 26 and 34 and of the coating material functions to maintain the diameter of this portion of the nosepiece 2 substantially the same as it is at the elevated temperature which for all practical purposes is the same as it is at ambient temperature.

In the preferred embodiment, the coating material comprises an epoxy resin formulation of the type disclosed in the Hucks' application which formulation is preferably applied to a rotating pipe at a temperature of about 220° F. The pipe is rotated until the coating material has cured to a point of resisting flow or slumping. The coating material is then fully cured to provide the pipe and, as explained above, the inner surface 28 of the end portion 12, the surfaces 26 and 28 adjacent the intersection 40, the surfaces 16, 24, and 26 and the inner surface 10 of the nosepiece 2 with a hardened, smooth, blister-free, chemical-resistant, and fluid-impervious coating that is continuous in both the axial and circumferential directions. It is to be understood that the foregoing description is for illustration purposes only and any other type of coating material such as polyester, urethane or any other type of resinous or metallic material may be readily employed within the scope of the instant invention.

In FIGS. 11–13, inclusive, there is illustrated a preformed protective covering for use in the belled end of a pipe which, as illustrated in FIGS. 12 and 13, comprises two generally cylindrical surfaces 50 and 52 joined by a radially extending surface 54. The surface 50 is the inner surface of a full length of pipe. The preformed protective covering comprises a member 56 having a generally cylindrical surface 58 for contacting the surface 52 and a radially extending surface 60 for contacting the surface 54. Although the member 56 is designed to have an interference fit with the surface 52 at ambient temperatures, the member 56 is preferably secured in position by a quick setting adhesive between the surfaces 58 and 52, and 54 and 60. The inner surface 62 of the member 56 has a diameter slightly less than the diameter of the inner surface 50 so as to provide a cavity 64 similar to the cavity 42, adjacent the intersection 66 of the inner surface 50 and the radially extending surface 54. This cavity 64 cooperates with the member 56 in functioning to control the flow of a resin coating material cast on the inner surface 50 of the rotating pipe until such resin coating material 68 has cured to a point of resisting flow or slumping so as to provide a protective covering of sufficient thickness for the intersection 66 and the surfaces 50 and 54 adjacent the intersection 66.

In the embodiment of the invention illustrated in FIGS. 14–16, inclusive, a protective covering is provided for the inner surfaces of a sleeve type coupling 70 having a pair of spaced annular grooves 72 in the inner surface thereof joined by a generally cylindrical surface 74. Each groove has a generally cylindrical surface 76 and a radially extending surface 78 which extends between the surface 74 and 76. The surfaces 74 and 78 meet to form an intersection 80. The preformed protective covering comprises an annular ring 82 having a surface 84 for contacting the surface 78 of each groove. The inner surface 86 of the annular ring 82 has a diameter slightly smaller than the diameter of the inner surface 74 so as to provide for a cavity 88 adjacent the intersection 80. If desired, the annular ring 82 may have an interference fit with the surface 76 but preferably, the annular ring 82 is retained in position by a relatively quick setting adhesive between the surfaces 84 and 78. The cavity 86 co-operates with the annular ring 82 in functioning to control the flow of a resin coating material cast on the inner surface 74 of the rotating coupling until such resin coating material 90 has cured to a point of resisting flow or slumping so as to provide a protective covering of sufficient thickness for the intersection 80 and the surfaces 78 and 84 adjacent the intersection 80. The resin coating material is also applied to the surface 76 and unites with the outer portion of the annular ring 82 to provide a protective covering for the surface 76.

In the embodiments of the invention illustrated in FIGS. 11–16, inclusive, the resin coating material preferably comprises an epoxy-resin formulation of the type disclosed in the Hucks' application so as to provide the treated surfaces with a hardened, smooth, blister-free, chemical-resistant, and fluid-impervious coating that is continuous in both the axial and circumferential directions. The preformed protective covering in these embodiments preferably comprises an acrylonitrile butadiene styrene material.

While the invention has been described in rather full detail, it will be understood that these details need not be strictly adhered to and that various changes and modifications may suggest themselves to one skilled in the art, all falling within the scope of the invention as defined by the subjoined claims.

What we claim is:

1. A method for providing a protective covering for the intersection formed by a portion of the tubular inner surface of an open ended tubular conduit and a wall surface inclined to said tubular inner surface where said tubular inner surface is provided with a cast, hardened, smooth, blister-free, chemical-resistant, and fluid-impervious coating comprising:
    (a) providing an open ended tubular conduit having at least one intersection comprising the junction of a portion of the tubular inner surface of said tubular conduit and a wall surface inclined to said tubular inner surface,
    (b) placing an open ended preformed covering in contact with said inclined wall surface and forming a cavity defined by said surfaces adjacent said intersection and the surface of a part of said preformed covering,
    (c) casting a coating on said portion of the tubular inner surface of said tubular conduit and said surfaces adjacent said intersection by distributing a flowable resin coating material over said portion of the tubular inner surface of said tubular conduit and said surfaces adjacent said intersection,
    (d) maintaining said resin coating material evenly distributed over said surfaces by rotating said tubular conduit, and
    (e) obstructing the flow of said resin coating material adjacent said surfaces defining said intersection to fill said cavity with said resin coating material and uniting said preformed covering and said resin coating material to provide said surfaces adjacent said intersection with a protective covering having a thickness at least equal to the thickness of said resin coating material on said portion of the tubular inner surface of said tubular conduit.

2. A method for providing a protective covering for the end portion of a pipe wherein the inner surface of the pipe is provided with a cast, hardened, smooth, blister-free, chemical-resistant, and fluid-impervious coating comprising:
    (a) providing an open ended pipe having an end portion having an outer surface, an axial extremity, a portion of the inner surface of said pipe and an intersection formed by the junction of the surface of said axial extremity with the surface of said portion of the inner surface of said pipe,
    (b) placing an open ended preformed covering over said end portion of said pipe so that the inner surfaces of said preformed covering are in contact with said outer surface of said end portion and at least a portion of said surface of said axial extremity, (c) shaping said preformed covering so that when placed over said end portion it forms a cavity defined by said surfaces adjacent said intersection and the surface of a part of said preformed covering, (d) casting a coating on said portion of the tubular inner surface of said end portion and said surfaces adjacent said intersection by distributing a flowable resin coating material over said surface of said end portion and said surfaces adjacent said intersection, (e) maintaining said resin coating material evenly distributed over said surfaces by rotating said pipe, and (f) obstructing the flow of resin coating material adjacent said surfaces defining said intersection to fill said cavity with said resin coating material and uniting said preformed covering and said resin coating material to provide said surfaces adjacent said intersection with a protective covering having a thickness at least equal to the thickness of said resin coating material on said inner surface of said end portion.

References Cited

UNITED STATES PATENTS

| | | | |
|---|---|---|---|
| 2,106,828 | 2/1938 | Chappell | 264—270 |
| 3,206,821 | 9/1965 | Keyser et al. | 264—270 |

ROBERT F. WHITE, *Primary Examiner.*

J. H. SILBAUGH, *Assistant Examiner.*